United States Patent
Bodin et al.

(10) Patent No.: US 7,827,284 B2
(45) Date of Patent: Nov. 2, 2010

(54) METHOD AND ARRANGEMENT IN A COMMUNICATION SYSTEM

(75) Inventors: Ulf Bodin, Luleå (SE); Daniel Lindholm, Luleå (SE); Jim Sundqvist, Luleå (SE); Olov Schelén, Norrfjädern (SE)

(73) Assignee: Netsocket, Inc., Plano, TX (US)

( * ) Notice: Subject to any disclaimer, the term of this patent is extended or adjusted under 35 U.S.C. 154(b) by 1179 days.

(21) Appl. No.: 10/673,323

(22) Filed: Sep. 30, 2003

(65) Prior Publication Data

US 2005/0073954 A1    Apr. 7, 2005

Related U.S. Application Data

(60) Provisional application No. 60/434,675, filed on Dec. 20, 2002, provisional application No. 60/435,347, filed on Dec. 23, 2002.

(30) Foreign Application Priority Data

Dec. 20, 2002    (SE)    .................................... 0203872

(51) Int. Cl.
G06F 15/173    (2006.01)
(52) U.S. Cl. .................. 709/226; 709/223; 370/230; 370/232; 370/233; 370/234
(58) Field of Classification Search ......... 709/223–226; 370/230, 232–234
See application file for complete search history.

(56) References Cited

U.S. PATENT DOCUMENTS

| | | | |
|---|---|---|---|
| 6,233,456 B1 * | 5/2001 | Schiff et al. .................. | 455/439 |
| 6,310,857 B1 | 10/2001 | Duffield et al. | |
| 6,366,559 B1 * | 4/2002 | Krishnan et al. ............. | 370/230 |
| 6,442,138 B1 * | 8/2002 | Yin et al. ..................... | 370/232 |
| 6,459,681 B1 | 10/2002 | Oliva | |
| 6,487,170 B1 * | 11/2002 | Chen et al. ................... | 370/231 |
| 6,496,480 B1 | 12/2002 | Ash et al. | |
| 6,721,568 B1 * | 4/2004 | Gustavsson et al. ......... | 455/450 |

(Continued)

FOREIGN PATENT DOCUMENTS

JP    11136256 A    5/1999

(Continued)

OTHER PUBLICATIONS

Teck Kiong Lee et al.: Efficiency comparisons between different model-based and measurement-based connection admission control under heavy traffic. In: Global Telecommunications conference, 1999. GLOBECOM '99, Dec. 5, 1999-Dec. 9, 1999, Dec 1999. On pp. 1629-1633 vol. 2.

(Continued)

Primary Examiner—William C Vaughn, Jr.
Assistant Examiner—Mohamed Ibrahim
(74) Attorney, Agent, or Firm—Slater & Matsil, L.L.P.

(57) ABSTRACT

A method for performing admission control in order to offer assurances on forwarding quality in networks comprising setting a threshold for each link where the threshold defines a maximum sum of forwarding resources requested by applications for their application data flows, ADFs, on the link. The level of the threshold is chosen by utilising knowledge about multiplexing properties of the ADFs on each link and by utilising knowledge about the forwarding resources of the links.

24 Claims, 3 Drawing Sheets

U.S. PATENT DOCUMENTS

| | | | |
|---|---|---|---|
| 6,765,873 B1* | 7/2004 | Fichou et al. | 370/235 |
| 6,839,767 B1* | 1/2005 | Davies et al. | 709/232 |
| 6,888,842 B1* | 5/2005 | Kirkby et al. | 370/414 |
| 7,149,185 B1* | 12/2006 | Suni | 370/230 |
| 2002/0036981 A1* | 3/2002 | Park | 370/230 |
| 2004/0071086 A1* | 4/2004 | Haumont et al. | 370/230 |
| 2005/0003824 A1* | 1/2005 | Siris | 455/452.1 |
| 2007/0058659 A1* | 3/2007 | Ayyagari et al. | 370/445 |

FOREIGN PATENT DOCUMENTS

| | | |
|---|---|---|
| JP | 2000295250 A | 10/2000 |
| WO | WO 02/056564 | 7/2002 |

OTHER PUBLICATIONS

Schelén, Olov, "Quality of Service Agents in the Internet," Doctoral Thesis, Luleå University of Technology, Sweden, Aug. 1998, pp. 1-107.

* cited by examiner

METHOD AND ARRANGEMENT IN A COMMUNICATION SYSTEM

This application claims the benefit of U.S. Provisional Application No. 60/434,675 filed on Dec. 20, 2002, and U.S. Provisional Application No. 60/435,347 filed on Dec. 23, 2002, which applications are hereby incorporated herein by reference.

This application claims priority to Swedish Patent Application No. 0203872-7, which was filed Dec. 20, 2002, and is incorporated herein by reference.

FIELD OF THE INVENTION

The present invention relates to a method for making admission control. Furthermore it relates to a node in a network comprising software for performing admission control.

BACKGROUND OF THE INVENTION

In recent years, asynchronous networks such as Internet Protocol (IP) and Asynchronous Transfer Mode (ATM) have become tremendously popular. These networks interconnect various lower layer networks (e.g., Ethernet, SONET, SDH, ADSL, etc.) to provide connectivity between end-points. In particular, the Internet has evolved to a global multi service network through which a great span of different applications communicate (e.g., web browsing, email, telephony, media streaming, and video conferencing).

In asynchronous networks, differentiated forwarding services can be created. While ATM offers multiple forwarding services (e.g., available bit-rate (ABR), constant bit-rate (CBR), etc.), IP networks has traditionally only offered one forwarding service (i.e., the best-effort service). In recent years, formal support for differentiated services has been added to the Internet architecture and Internet Service Providers (ISPs) can thereby configure their IP networks for multiple services.

Configuring an asynchronous network for multiple services, of which some offer guarantees or assurances on the forwarding quality given to users, means to divide forwarding resources such as buffer capacity and forwarding capacity into different classes. We refer to both buffer capacity and forwarding capacity as forwarding recourses. Then, the admission to classes that will carry traffic for which guarantees or assurances shall be given needs to be controlled. We refer to this as admission control.

Note that admission control can be used also to maintain guarantees or assurances in single service networks.

The admission control mechanism can be distributed in network nodes, or centralized in one or more servers or dedicated computers. All these different possibilities are in this text called a node. When it is referred to a node in this text it is thus meant to include both network nodes and servers and dedicated computers. When distributed, the admission control can be invoked by e.g. a signalling protocol. The location of the admission control mechanism does not directly influence the forwarding quality guaranteed or assured for the service in question. Instead the location may affect scalability, performance, etc.

For asynchronous networks, high utilisation of forwarding resources can be achieved through statistical multiplexing. Then, for services offering guarantees or assurances on forwarding quality, the amount of traffic at individual links needs to be carefully controlled.

Knowing the peak-rates of Application Data Flows, ADFs, deterministic forwarding guarantees can be offered through admission control (i.e., sources make an admission request through the network, or to an admission control server before sending any traffic). A peak-rate is the maximum rate at which an ADF can send traffic in a given time interval, see FIG. 1. The average-rate is often calculated over a long time interval, while peak-rate should be calculated over a much shorter time interval.

Unfortunately, offering deterministic guarantees results in low network utilization when ADFs have varying sending rates (e.g., video coders such as ITU-T H.263 produces varying amounts of data depending on movements in the encoded picture). For ADFs having varying sending rates, network utilization can be improved though statistical multiplexing. Several independent flows sharing a common resource are said to benefit from statistical multiplexing if the sum of their peak rates can exceed the total link bandwidth without resulting in quality degradation. This is based on the assumption that the flows send at their peak-rates independently of each other and therefore distributed over time.

To improve network utilization through statistical multiplexing, the sum of peak-rates for ADFs sharing a common link must exceed that link's forwarding capacity, or the portion of that link's capacity allocated for these ADFs. Note, however, that the sum of these ADFs average rates must not exceed that capacity. Then, the link will be overloaded and no forwarding guarantees can be offered.

Since the sum of peak-rates can exceed the (allocated) link capacity, offering deterministic guarantees is not possible. Statistical guarantees on that e.g. the loss-rate at such a link does not exceed a pre-defined value can however be offered. Then, statistical properties of each individual ADF, or the aggregate of all ADFs must be known to calculate the risk of violating the statistical guarantee when accepting an additional ADF for the link in question.

Statistical properties of ADFs might be known beforehand (e.g., they can be given from the definition of the speech codec used), or they can be estimated through measurements. The statistical properties for traffic of e.g. IP telephony applications can be reasonably predictable and the risk of violating the statistical guarantee in question can thus be calculated without measuring these properties.

The statistical properties of ADFs can however be very unpredictable (e.g., for video conference applications the statistical properties of their traffic depends on movements of people participating in the conference). For such applications, measuring these properties is preferable.

The information on statistical properties needs to be accurate for very short time-scales to be used in the mathematical methods used to calculate the risk of violating given guarantees. This means that measurement-based admission control for statistically guaranteed services requires network nodes to perform operations with high time complexity (i.e., processing intensive operations).

Another approach to offer assurances on forwarding quality while allowing for statistical multiplexing is to make admission control decisions using a forwarding resource threshold for each link in a network. That is, a maximum amount of forwarding resources requested from ADFs for each such link, e.g. a maximum sum of ADF bit-rates for each such link. We refer to this threshold as the provisioning level. In the claims it is however called threshold.

The sum of accepted forwarding resources for ADFs plus the forwarding resource of the request to be evaluated can be compared with each link's provisioning level to decide whether one or more of these levels is exceeded or not. An advantage with this approach is that support for advance reservations easily can be included. Such a threshold based admission control is described in "Quality of Service Agents in the Internet. Ph.D. thesis Olov Schelén, August 1998. ISSN 1402-1544. ISRN LTU-DT-98/26-SE". IQ-Man™ described in this thesis take admission decisions using separate provisioning level for each link in a network.

A problem in this system is that the links are not fully utilised when aggregates of ADFs having different peak and average rates use the links.

SUMMARY OF THE INVENTION

An object of the invention is to provide a method for admission control where the forwarding capacity on the links are highly utilised through statistical multiplexing while offering an assurance on forwarding quality.

A further object of the invention is to limit the amount of measurements especially in the network nodes.

Hereby the provisioning levels, or thresholds as they are called in the claims, are chosen to allow for correct number of ADFs to maintain target assurances on forwarding quality (e.g., less than one percent packet loss measured over two minutes). The multiplexing properties of the ADFs are utilised to set the level of the threshold. Hereby the forwarding capacity on the link can be better utilised.

DETAILED DESCRIPTION OF EMBODIMENTS

Figure 1:
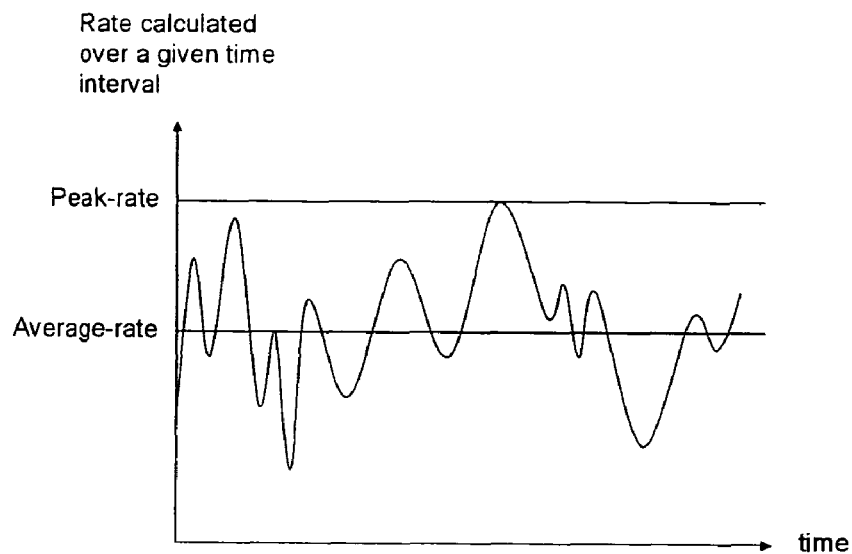
FIG. 1 shows a diagram of peak rate and average rate.

Assurances on forwarding quality can be offered through provisioning level based admission control. However, to benefit from multiplexing gains, the admission control must allow for limited overbooking (i.e., the sum of all accepted ADFs' peak-rates must be allowed to exceed the allocated link capacities). The problem is how to select levels of overbooking for each link in a network. These levels must support target quality assurances while allowing high degrees of statistical multiplexing. The level of overbooking is determined from the sum of all accepted ADFs' peak-rates and the provisional level used.

The level of overbooking for a particular link is determined by a number of parameters; the link speed, its buffer capacity or acceptable delay, acceptable loss-rate, multiplexing properties of present ADFs, and the mix of ADFs with different multiplexing properties (i.e., the traffic mix). While link properties and parameters defining the target forwarding quality are known beforehand, multiplexing properties of different ADFs need to be estimated or measured.

The invention presented in this application is a method for making admission control where a requested forwarding resource threshold, usually a bit-rate threshold, is set for each link in order to offer assurances on forwarding quality. The level of said threshold is chosen by utilising knowledge about multiplexing properties of the ADFs on each link.

A first embodiment of the invention is a method to estimate multiplexing properties of different ADFs off-line (e.g., through recorded ADFs used in simulations or lab tests, or through modelling), and to use this information to select provisioning levels, also called thresholds, giving appropriate overbooking for links with given forwarding resources. In this embodiment, assumptions on user behaviours and application configurations may be needed to estimate multiplexing properties. E.g., a video codec such as ITU-T H.263 sends different amounts of data depending on how much the picture changes over time.

A second embodiment is a method to measure multiplexing properties of aggregated ADFs on-line, and to use this information to adapt provisioning levels, also called thresholds. The adaptation aims at levels giving appropriate overbooking without any knowledge of individual ADFs' multiplexing properties. Thus, assumptions on user behaviours and application configurations are not needed in this embodiment. The price for this is the operation of on-line measurements in network nodes.

In both embodiments we assume that a provisioning level is associated with each link in a network offering assurances on forwarding quality. Such provisioning level can e.g. be managed by a network node or by an admission control server.

Moreover, we assume that applications directly or indirectly define a capacity, usually a bit-rate in their admission requests and that the meaning of these bit-rates is known (e.g., they are the peak-rate of each different ADF). Defining bit-rates indirectly means that an application's identity can be detected by some mechanism and that the identity can be mapped to a bit-rate with known meaning.

The two embodiments are presented separately in the following.

The first embodiment: Estimating multiplexing properties of ADFs for provisioning.

In this first embodiment of the invention, we assume that the multiplexing properties of each different ADF can be estimated off-line. Such estimations can e.g. be made by recording a sample of each ADF. Then, these samples can be used in simulations, or in lab tests to estimate maximum numbers of each type of ADF that can share different amounts of common forwarding resources without violating target assurances (e.g., allowed loss-rates or delays). From such simulations or lab tests, appropriate levels of overbooking can be identified for all links having different forwarding resources allocated for the forwarding service in question.

Using the identified levels of overbooking for each type of ADF (i.e., maximum number for each type of ADF), appropriate provisioning levels for all links in the network can be found. E.g., the maximum number of each type of ADF can be multiplied with their (directly or indirectly) respectively requested bit-rates. From the lowest resulting bit-rate (for all different ADFs), each link can then be provisioned accordingly, which completes the creation of an assured service.

When the mix between different types of ADFs is known, simulations or lab tests can be made using this mix. Thereby, the level of overbooking can be identified more accurately (i.e., otherwise the lowest resulting bit-rate, or level of overbooking among different types of ADFs has to be used for provisioning). This may give higher network utilization compared with the settings resulting from the actions described in the previous paragraph.

To summarise this embodiment; it defines a concept of using different levels of provisioning for links with different forwarding resources and to select these levels to give assurances on forwarding quality to ADFs with known multiplexing properties.

The second embodiment: Measuring multiplexing properties of ADF aggregates for provisioning.

In the second embodiment of the invention, we do not assume any knowledge of individual ADFs' multiplexing properties. Instead, multiplexing properties of traffic (ADF) aggregates are measured and used to adapt provisioning levels for each link in a network. The method for this adaptation includes the following actions:

Each link in the network is initially provisioned. This initial provisioning can, but does not need to be done using the estimation method described for the first embodiment. The potential advantage from using the estimation method is less frequent measurements and faster adaptation to appropriate provisioning levels compared to arbitrarily selection of levels being very different than the appropriate ones.

Each link has a fixed amount of actual forwarding resources set aside for a particular service. We refer to these resources as allocated resources, and the capacity part of them as allocated capacity. The amount of resources provisioned to match the allocated resources is called res_max (i.e., the provisioning level). The resources reserved for the actual traffic on the link (act) is called res. The reserved resources include both forwarding capacity and buffer capacity. However, since the amount of reserved buffer capacity is proportional to the amount of reserved forwarding capacity, we refer to res as the reserved capacity.

Note that since res_max may change over time, another more stable level should be introduced in order to support reservations in advance (e.g., some previous value of res_max that has proven through measurements to not give violations in forwarding quality).

Figure 2:
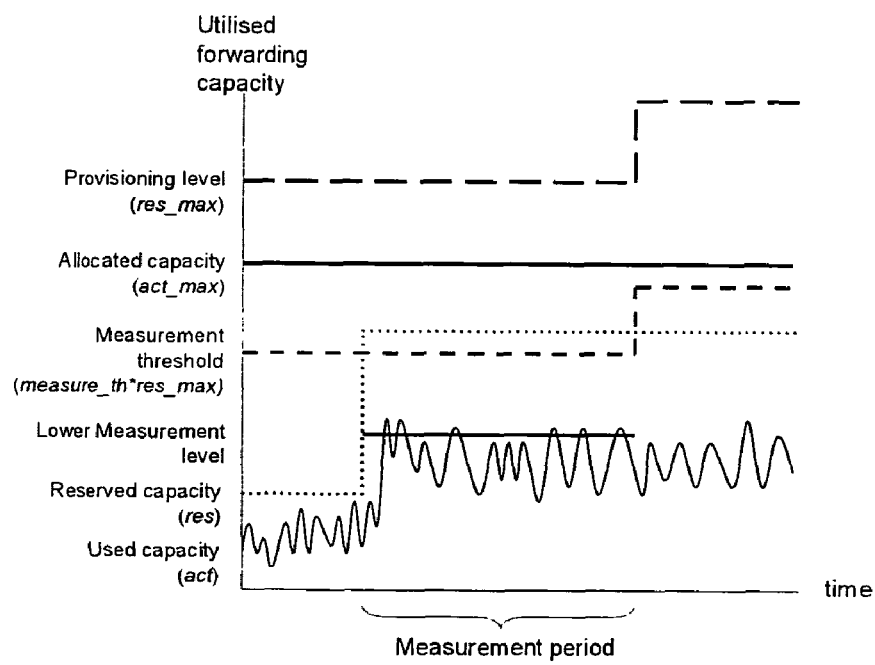
FIG. 2 is a diagram over the utilised forwarding capacity on a link.
Figure 3:
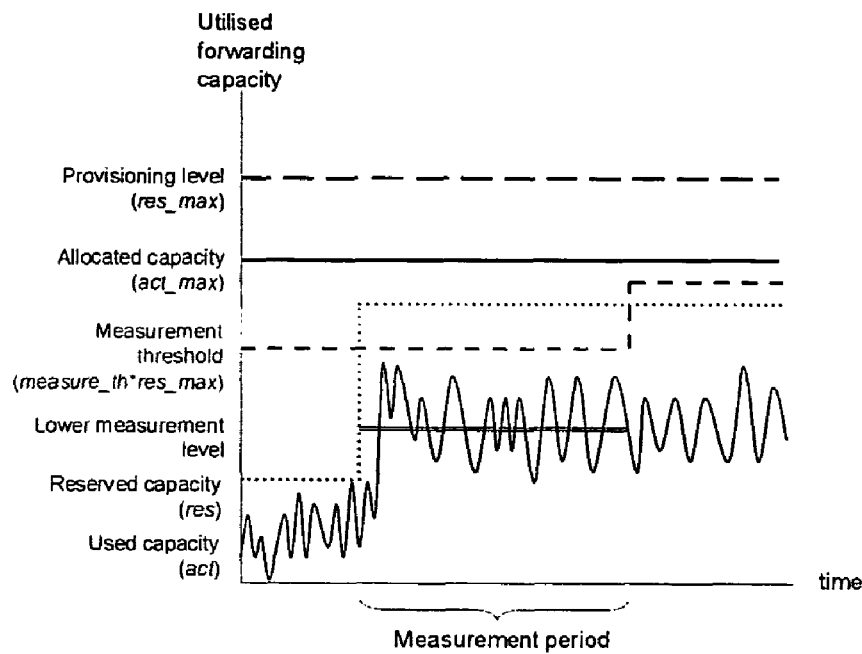
FIG. 3 is a diagram over the utilised forwarding capacity on a link.
Figure 4:
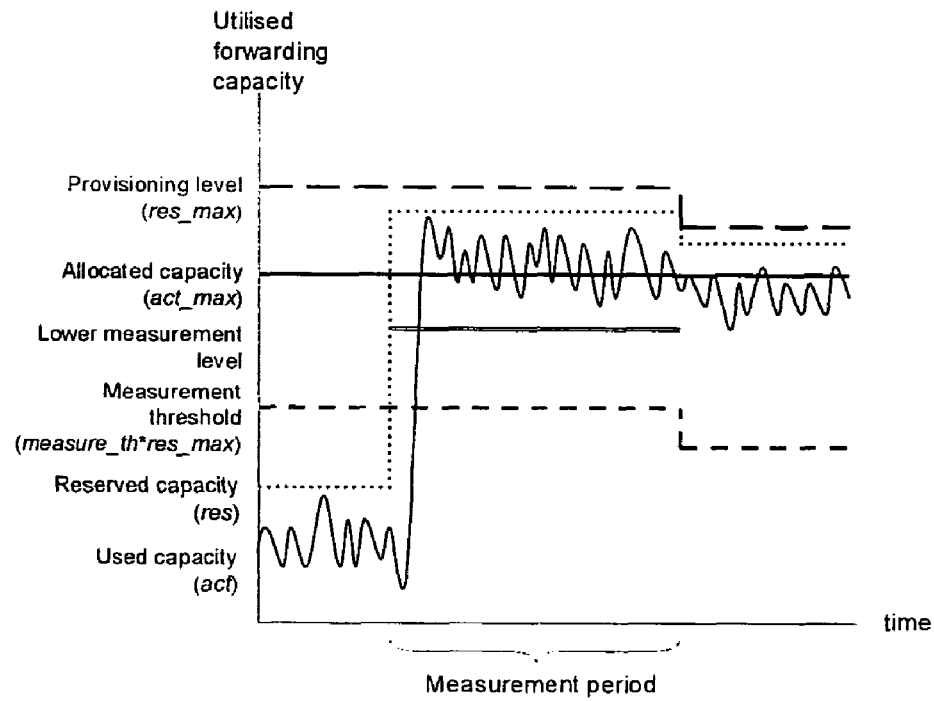
FIG. 4 is a diagram over the utilised forwarding capacity on a link.

Measurements are in this embodiment performed at two different rates. A measurement at a third rate is also possible and sometimes preferable. This is described later. One of these two rates, called the first rate, also referred to as act_max can be equal to or slightly lower than the allocated capacity of the link. To have a safety margin it could be preferred to use a first rate which is slightly lower than the allocated capacity of the link. In FIGS. 2-4 act_max is shown to be equal to the allocated capacity but it should be understood that the first rate, act_max suitably could be a bit lower than the allocated capacity for giving a safety margin. The other rate, called the second rate, can be dependent on the reserved resources on the link and the threshold (i.e., the provisioning level). For example the second rate can be equal to $$k*(res/res\_max)*act\_max$$

where k is a constant.

In the following, we refer to the second rate as the second measurement level and to the first rate, act_max, as the first measurement level.

Measurements are initiated when the reservation level (res) reaches a fraction of res_max called measure_th. Given a 10 Mbps res_max and measure_th of 0.8, measurements will start at a reservation level of 8 Mbps (res_max*measure_th). This is the measurement threshold.

Note that the fraction res/res_max is an invariant related to the measurement threshold since res needs to be equal or larger than this threshold (i.e., res_max*measure_th) for measurements to be initialized. Note that measurements at the first rate (i.e. at the act_max) can be made continuously since the rate never changes. Measurements at the second rate need however to be initialised, or re-initialised to reflect changes in the reserved capacity (res).

For assurances of maximum delay and loss-rate, measurements of traffic rates on the link are performed by measuring means. The measuring means could for example be two token bucket (TB) filters (both configured with a depth in number of bytes or bits corresponding to the assured maximum delay and the two different rates to be monitored). By counting network data units (e.g., IP packets) that conform and those that do not conform (i.e., excess data units) to each of these filters, loss-rates can be calculated for the two rates monitored. Other methods for performing the measurements are also possible. For example Time sliding windows could be used.

For the measurements, multiple samples of appropriate length should be taken. E.g., a sample length of two minutes may be feasible in certain network nodes without overloading their CPU (e.g., with operations of matching access lists to two TB filter instances). However, to track peaks in ADF bit-rates caused by changing user behaviours (e.g., a period with intensive discussions and hand waving in a video conference), multiple such samples should be taken to cover a longer period (e.g., 30 minutes). Note that the sample length determines over which time-scale given assurances are valid (i.e., loss-rates may be higher at shorter time-scales than the one used for measurement samples).

If the reservation level changes during the measurement period, there are several ways of handling this situation properly. E.g.:

Abort the measurement period, and use only the "stable" part.

Abort the current measurement period, and initiate a new measurement period.

Continue measuring until the measurement period is finished. This means to change the lower measurement rate according to the new res/res_max after each change in reservation level (res).

Continue measuring until the period is finished (i.e., by changing the lower measurement rate after each change in reservation level), or until the reservation level becomes less than the level at which measurements are initiated.

Block or delay new reservation requests until the measurement period is finished. This method can be used when res is close to max_res.

Each measurement sample can result in three different cases; case 1—increase the provisioning level, case 2—preserve the current provisioning level, and case 3—decrease the provisioning level. These cases are described separately in the following three sections. Thereafter, the algorithm is more formally described.

Case One: Increase the Provisioning Level

In FIG. 2 a diagram over the utilised forwarding capacity on a link where the used capacity is low and no quality violations exist is shown. For the sake of simplicity we continue here with the example with the link having 10 Mbps allocated. Links with other capacities are of course also possible to use. Say that all data units conform to the 10 Mbps TB filter and that the loss-rate calculated from conforming and excess data units at the 8 Mbps TB filter is less than the assured loss-rate. This indicates that the traffic does not use all reserved forwarding capacity and that res_max thus can be increased to allow for more traffic. However, to make such a decision, multiple measurement samples should be examined to limit the risk that true peak-rates are not detected.

The increase of the threshold can be related to the assured loss rate and the actual loss rate. To decide how much to increase the provisioning level, an assumption on the relation between loss-rate and load can be used. This relation can for example be assumed to be linear or exponential. If the relation between loss-rate and load is assumed to be exponential the new provisioning level can suitably be chosen from the old through the following equation:

$$res\_max = res\_max * \log assured\_lr / \log act\_lr \quad \text{(equation 1)}$$

Say that the measured actual loss-rate (act_lr) is 0.1% and that the assured loss-rate (assured_lr) is 1%. For this example, equation 1 gives a new provisioning level of 11 Mbps. Note that increasing the level based on measurements at rates lower than what is allocated can be considered conservative. This is because ADFs multiplexes equally or better at larger aggregates. Thus, using the same provisioning level, loss-rates are likely to be equal or lower e.g. for a TB filter monitoring 9 Mbps of reserved capacity compared to for a TB filer monitoring 8 Mbps of reserved capacity.

Note that increasing the provisioning level (res_max) means to also increase the measurement threshold (measure_th*res_max).

Case Two: Preserve the Current Provisioning Level

In FIG. 3 a diagram over the utilised forwarding capacity on a link where the used capacity is higher than in FIG. 2 is shown. Quality violations are only detected at the lower rate measured. If the lower TB filter indicates a loss-rate higher than assured_lr, but the TB filter at act_max indicates a loss-rate lower than assured_lr, the provisioning level (res_max) should not be adjusted. I.e., the measurements do not give any clear indication on how to adjust the provisioning. To get a clear indication, more resources need to be reserved.

To reduce the amount of unnecessary measurements, the lower TB filter can in one embodiment be raised step by step by increasing measure_th (which shrinks the measurement span since res_max is not changed). The measurement threshold can be increased using a suitable equation, e.g.: using a fixed rate (incr_rate):

$$measure\_th = incr\_rate * measure\_th \quad \text{(equation 2)}$$

This increase can be made until the measurement threshold (measure_th*res_max) becomes equal to the res_max (i.e., measure_th must be lower than 1). Another example for how to make the increase is to use the following equation:

$$measure\_th = (1.0 + measure\_th) / 2.0 \quad \text{(equation 3)}$$

Note that increasing measure_th leads to that the lower measurement level will be equal or higher than for the measurement period resulting in the increase. This is because the fraction res/res_max used in the definition of the lower measurement level (i.e., (res/res_max)*act_max) is an invariant related to the measurement threshold. I.e., res needs to be equal or larger than this threshold (i.e., res_max*measure_th) for measurements to be initialized. The measurement threshold could also be increased manually.

There is however a risk in shrinking the measurement span since that gradually disables the algorithm from detecting changes in the multiplexing properties of the ADF aggregate (i.e., measurement may not be taken at a level of reserved capacity that causes quality violations). Therefore, the option of reducing the measurement span should be combined with a minimum span (min_span). Then, when reaching this minimum span, the mechanism of shrinking the measurement span can be disabled. Note that setting min_span to zero means that the measurement span eventually may shrink to zero. It could also be preferable to measure at the first rate continuously in order to detect quality violations.

Case 3: Decrease the Provisioning Level

In FIG. 4 a diagram over the utilised forwarding capacity on a link where the used capacity is high and quality violations are measured at both rates is shown. If both TB filters indicate higher loss-rate than assured_lr, the threshold has to be decreased to avoid violating the quality metric. The new provisioning level is calculated using equation 1. Note that this implies to pre-empt accepted ADFs until the provisioning level in question is not exceeded.

To avoid oscillations in provisioning level adjustments, further increases of the level for a link that has once decreased its provisioning level can be prevented. However, even if this is the default behaviour, further threshold increases after a decrease should be possible to enable. Moreover, the operator should be able to reset the state manually in an attempt to retry increasing provisioning levels (e.g., because the multiplexing properties of traffic aggregates are assumed to have changed).

Pre-empting ADFs is not required for the algorithm. Violation of the assured quality can be accepted by allowing exceeding ADFs to keep their reservation and instead block new reservations until the reserved capacity becomes less than the provisioning level. Moreover, given that act_max, i.e. the first measurement rate, is slightly lower than the capacity actually allocated for the link in question, measurements at an additional rate can be used to decide whether pre-empting ADFs are needed or not. E.g., a TB filer with a rate in between the actually allocated capacity and act_max can be initialised. If this TB filer indicates higher loss-rate than assured_lr, pre-empting ADFs can be considered necessary to avoid true quality violations. On the other hand, an indication of lower loss-rate than assured_lr with this TB filter means that ADFs will not see any quality violations and pre-empting ADFs is thus not needed. Hence, we include this feature as an optional part of the algorithm.

Algorithm Outline

The following pseudo code defines one embodiment of this invention more formally:

```
if (res > measure_th * res_max) then initiate measurements;
if (act_lr < assured_lr at both TB filters) then
    res_max = res_max * log assured_lr / log act_lr
end
if (act_lr < assured_lr at higher TB filter and act_lr >
assured_lr at lower TB filter)
then
    keep provisioning level;
    if(incr_rate is defined) then
        measure_th = incr_rate * measure_th
        if (measure_th > 1.0) then measure_th = 1.0;
    else
        measure_th = (1.0 + measure_th) / 2.0;
    end
    if (measure_th * res_max > res_max - min_span) then
        measure_th = (res_max - min_span) / res_max
    end
end
if (act_lr > assured_lr at both TB filters) then
    res_max = res_max * log assured_lr / log act_lr;
    possibly prevent further increases (default);
end
```

According to the invention a node or a server in a network which comprises software for performing admission control further comprises software for performing the method as described above. Furthermore the node comprises or is connectable to a measuring means adapted to perform the measurements on the links as defined above.

Figure 5:
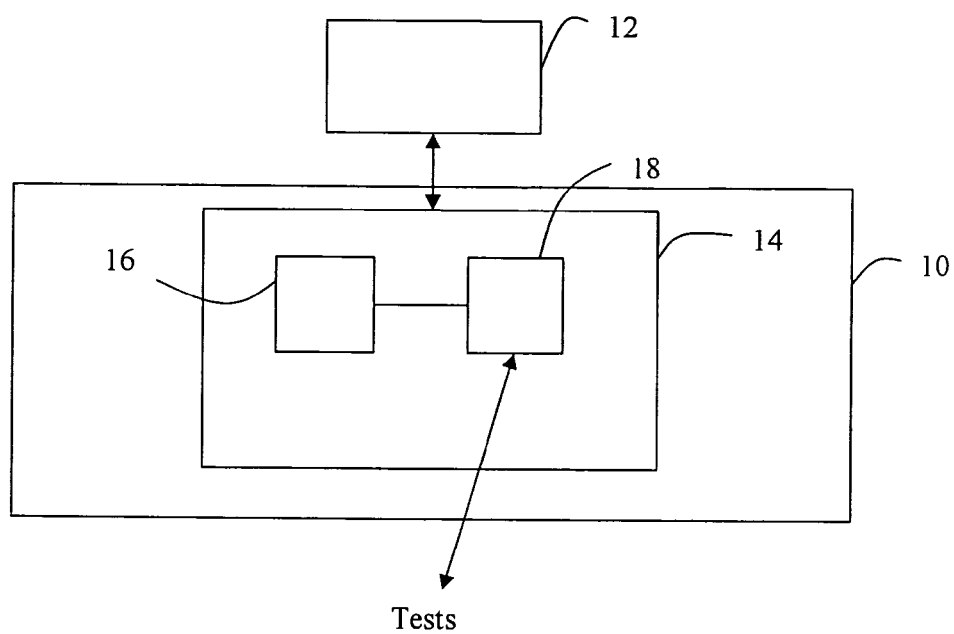
FIG. 5 shows a node according to a first embodiment of the invention.

In FIG. 5 a node 10 according to the first embodiment of the invention is shown. The node is located somewhere in a network. A client 12 is connectable to the node 10 and requests reservations from the node. Said node comprises admission controlling means 14 adapted to perform admission control in order to offer assurances on forwarding quality in networks. Said admission controlling means 14 comprises threshold setting means 16 adapted to set a threshold for each link, said threshold defining a maximum sum of forwarding resources requested by applications for their application data flows, ADFs, on the link. According to the invention said threshold setting means 16 is further adapted to utilise knowledge about multiplexing properties of the ADFs on each link and knowledge about forwarding properties of the link when choosing the level of said threshold.

Suitably, the threshold setting means 16 is further adapted to utilise knowledge about the traffic mix of different ADFs on each link when choosing the levels of said thresholds.

In this first embodiment of the invention the admission controlling means 14 comprises estimating means 18 connected to the threshold setting means 16. Said estimating means 18 is adapted to retrieve results from preparatory tests of recorded samples of ADFs expected on a link and estimate multiplexing properties of these ADFs off-line. Preparatory tests could as discussed above be lab tests or simulations on the different ADFs. Said estimating means 18 is further adapted to forward the estimation to the threshold setting means 16, which is adapted to use the estimation for choosing the level of said threshold.

The estimating means 18 can further be adapted to use assumptions on user behaviour and application configurations for the estimation. Hereby the estimation can be better.

Figure 6:
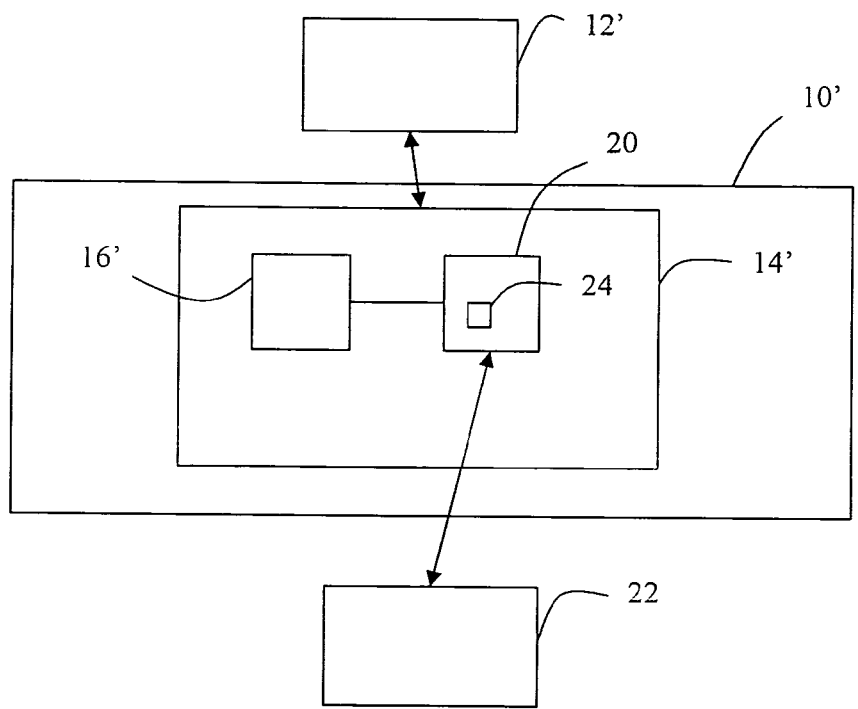
FIG. 6 shows a node according to a second embodiment of the invention.

In FIG. 6 a node 10' according to the second embodiment of the invention is shown. A client 12' is connectable to the node 10' and requests reservations from the node. Said node comprises admission controlling means 14' adapted to perform admission control in order to offer assurances on forwarding quality in networks. Said admission controlling means 14' comprises threshold setting means 16' adapted to set a threshold for each link, said threshold defining a maximum sum of forwarding resources requested by applications for their application data flows, ADFs, on the link.

According to the invention said threshold setting means 16' is further adapted to utilise knowledge about multiplexing properties of the ADFs on each link and knowledge about forwarding properties of the link when choosing the level of said threshold.

Suitably, the threshold setting means 16' is further adapted to utilise knowledge about the traffic mix of different ADFs on each link when choosing the levels of said thresholds.

In this second embodiment the threshold setting means 16' is adapted to set an initial threshold for each link. This initial threshold could be arbitrarily selected or estimated according to what has been described in relation to the first embodiment. Furthermore the admission controlling means 14' comprises a measurement requesting means 20, which is connected to the threshold setting means 16' and adapted to retrieve measurements from a measuring means 22 in a node in the network. It could be in another node or in the same node as the admission controlling means. The measuring means 22 is adapted to repeatedly, during usage, measure multiplexing properties of aggregated ADFs online on each link and these measurements are thus forwarded to the measurement requesting means in the admission control means 14'. The threshold setting means 16' is then adapted to use these measurements to dynamically adapt the thresholds to the measurements during usage.

The measuring means 22 performs measurements at least two different rates, one measurement at a first rate, which is equal to or lower than the amount of allocated resources on the link and one measurement at a second rate, which is lower than the first rate. The second rate can be dependent on the reserved resources on the link and the threshold as described above. To be able to recognise an overload in time and in order to have a safety margin it can be preferable to measure at a first rate which is slightly lower than the amount of allocated resources on the link.

The threshold setting means 16' is adapted to increase the threshold when both the measurement at the first and second rates indicate lower loss-rates than what is assured;

decrease the threshold when both the measurement at the first and second rate indicate higher loss-rates than what is assured; and maintaining the threshold when the measurement at the second rate indicates higher loss-rate than assured and the measurement at the first rate indicates lower loss-rate than assured.

The measurement requesting means 20 comprises suitably, but not necessarily a measurement threshold means 24 adapted to define a level of resource reservations on the link above which the measurements should be requested. I.e. a measurement threshold is set and when the level of reservations rises above this measurement threshold measurements are requested to be done in the measuring means 22.

In one embodiment the measurement threshold means 24 is adapted to increase the measurement threshold in steps when the measurement at the second rate indicates higher loss-rate than assured and the measurement at the first rate indicates lower loss-rate than assured. However, the measurement threshold should never be increased over a predefined maximum level which is set to be equal to or lower than the level of allocated resources of the link. The measurement threshold could also be increased manually.

In one embodiment of the invention the measuring means 22 is adapted to measure at a third rate, which is higher than the first rate but equal to or lower than the level of allocated resources on the link, when the measurement at the first rate indicates a higher loss rate than assured. The loss rate measured at this third rate is indicative of if it is necessary to pre-empt ADFs from the link or if it is enough to prevent new ADFs from entering the link.

The main merits of the invention are that it allow for services assuring forwarding quality and high network utilization through statistical multiplexing without requiring processing intensive measurement in network nodes. The first embodiment does not require any measurements at all. The second embodiment requires periods of measurements invoked for individual links when critical amounts of forwarding capacity is reserved. Since these periods are invoked only when measurement are needed to try adjusting an admission threshold, the measurement overhead is limited.

However, measurements are made by network nodes facing high load. Thus, the burden on network nodes caused by measurements can still be a problem. To avoid overloading network nodes, the CPU load can preferably be checked before initialising measurements. Note, though, that measurements are made on coarser time-scales than measurements for creation of statistically guaranteed forwarding quality.

The selection of which embodiment to use (i.e., to estimate multiplexing properties of ADFs for service provisioning, or to measure multiplexing properties of traffic aggregates for provisioning) is a trade-off between having no measurement overhead but lower network utilization, and having a measurement overhead but higher network utilization. Also, with the second embodiment, time consuming estimations of ADFs' multiplexing properties through simulations, lab tests, or modelling is avoided. However, as mentioned above, such estimations can give less frequent measurements and faster adaptation to appropriate thresholds.

The method according to the invention is implemented by means of a computer program product comprising the software code means for performing the steps of the method. The computer program product is run on a computer placed in a node in a network as described for the two embodiments above. The computer program is loaded directly or from a computer usable medium, such as a floppy disc, a CD, the Internet etc.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A method for performing admission control in order to offer assurances on forwarding quality in networks comprising the steps of:
   setting a resources requested threshold for each link where said resources requested threshold defines a maximum sum of forwarding resources requested by applications for their application data flows, ADFs, on the link;
   calculating a measurement level threshold, the measurement level threshold being a rate lower than the resources requested threshold;
   determining whether a reservation level exceeds the measurement level threshold;
   upon determining that the reservation level exceeds the measurement level threshold, repeatedly measuring, during usage, multiplexing properties of aggregated ADFs on each link, each measuring being performed over a period of time;
   dynamically adapting said resources requested threshold by utilizing the measured multiplexing properties of the ADFs on each link and by utilizing knowledge about the forwarding resources of the links;
   recalculating the measurement level threshold based on the dynamically adapted resources requested threshold; and
   preventing an overload before it occurs by controlling admission to each link based on the dynamically adapted resources requested threshold.

2. The method according to claim 1, further comprising setting an initial threshold for each link.

3. The method according to claim 2, characterized by choosing the initial threshold by estimating multiplexing properties of different ADFs off-line, said estimation being based on results from preparatory tests of recorded samples of ADFs, which are expected on a link and use this estimation when choosing the level of said threshold.

4. The method according to claim 2, characterized by performing the measurements at least two different rates.

5. The method according to claim 4, characterized by measuring at a first rate, which is equal to or lower than an amount of allocated resources on the link and measuring at a second rate, which is lower than the first rate.

6. The method according to claim 5, wherein the second rate is dependent on reserved resources on the link and the resources requested threshold.

7. The method according to claim 5, characterized by
   increasing the resources requested threshold when both the measurement at the first and second rates indicate lower loss-rates than what is assured;
   decreasing the resources requested threshold when both the measurement at the first and second rates indicate higher loss-rates than what is assured; and
   maintaining the resources requested threshold when the measurement at the second rate indicates a higher loss-rate than assured and the measurement at the first rate indicates a lower loss-rate than assured.

8. The method according to claim 5, characterized by introducing a measurement threshold, which defines a level of forwarding capacity reservations on the link above which the measurements are initiated.

9. The method according to claim 8, characterized by increasing the measurement threshold in steps but not over a predefined maximum level which is lower than a level of allocated resources of the link when the measurement at the second rate indicates a higher loss-rate than assured and the measurement at the first rate indicates a lower loss-rate than assured.

10. The method according to claim 5, characterized by measuring at a third rate, which is higher than the first rate but equal to or lower than the allocated resources of the link when the measurement at the first rate indicates a higher loss-rate than assured, the loss-rate measured at the third rate being indicative of if it is necessary to pre-empt ADFs from the link or if it is enough to prevent new ADFs from entering the link.

11. A node in a network comprising a memory and a processor performing admission control in order to offer assurances on forwarding quality in networks and software for setting a threshold for each link, said threshold defining a maximum sum of forwarding resources requested by applications for their application data flows, ADFs, on the link, characterized in that said node further comprises software for performing the method in claim 1.

12. A node in a network according to claim 11, characterized in that it comprises or is connectable to a measuring means adapted to perform measurements on the links.

13. A computer program product directly loadable into the internal memory of a processing means within a computer placed in a node, the computer program product being embodied in a non-transitory medium readable by the computer, wherein the medium readable by the computer comprises a software code means for performing the steps of claim 1.

14. A computer program product embodied in a computer-readable non-transitory medium, the computer-readable non-transitory medium comprising a readable program for causing a processing means to control an execution of the steps of claim 1.

15. A computer program product for providing admission control, the computer program product having a non-transitory computer-readable medium with a computer program embodied thereon, the computer program comprising:
   computer program code for setting a resources requested threshold for each link where said resources requested threshold defines a maximum sum of forwarding resources requested by applications for their application data flows, ADFs, on the link;
   computer program code for calculating a measurement level threshold, the measurement level threshold being a rate lower than the resources requested threshold;

determining whether a reservation level exceeds the measurement level threshold;

computer program code for, upon determining that the reservation level exceeds the measurement level threshold, repeatedly measuring, during usage, multiplexing properties of aggregated ADFs on each link, each measuring being performed over a period of time;

computer program code for dynamically adapting a level of said resources requested threshold by utilizing the measured multiplexing properties of the ADFs on each link and by utilizing knowledge about the forwarding resources of the links;

computer program code for recalculating the measurement level threshold based on the dynamically adapted resources requested threshold; and computer program code for preventing an overload before it occurs by controlling admission to each link based on the dynamically adapted resources requested threshold.

16. The computer program product of claim 15, further comprising computer program code for setting an initial threshold for each link.

17. The computer program product of claim 16, further comprising computer program code for choosing the initial threshold by estimating multiplexing properties of different ADFs off-line, said estimation being based on results from preparatory tests of recorded samples of ADFs, which are expected on a link.

18. The computer program product of claim 16, further comprising computer program code performing the measurements at least two different rates.

19. The computer program product of claim 18, further comprising computer program code for measuring at a first rate, which is equal to or lower than an amount of allocated resources on the link and for measuring at a second rate, which is lower than the first rate.

20. The computer program product of claim 19, wherein the second rate is dependent on reserved resources on the link and the threshold.

21. The computer program product of claim 19, further comprising, computer program code for increasing the resources requested threshold when both the measurement at the first and second rates indicate lower loss-rates than what is assured;

computer program code for decreasing the resources requested threshold when both the measurement at the first and second rates indicate higher loss-rates than what is assured; and computer program code for maintaining the resources requested threshold when the measurement at the second rate indicates a higher loss-rate than assured and the measurement at the first rate indicates a lower loss-rate than assured.

22. The computer program product of claim 16, further comprising computer program code for introducing a measurement threshold, which defines a level of forwarding capacity reservations on the link above which the measurements are initiated.

23. The computer program product of claim 19, further comprising computer program code for increasing the resources requested threshold in steps but not over a predefined maximum level which is lower than a level of allocated resources of the link when the measurement at the second rate indicates a higher loss-rate than assured and the measurement at the first rate indicates a lower loss-rate than assured.

24. The computer program product of claim 19, further comprising computer program code for measuring at a third rate, which is higher than the first rate but equal to or lower than the allocated resources of the link when the measurement at the first rate indicates a higher loss-rate than assured, the loss-rate measured at the third rate being indicative of if it is necessary to pre-empt ADFs from the link or if it is enough to prevent new ADFs from entering the link.

* * * * *